(12) United States Patent
Tsubouchi et al.

(10) Patent No.: US 11,749,270 B2
(45) Date of Patent: Sep. 5, 2023

(54) OUTPUT APPARATUS, OUTPUT METHOD AND NON-TRANSITORY COMPUTER-READABLE RECORDING MEDIUM

(71) Applicant: Yahoo Japan Corporation, Tokyo (JP)

(72) Inventors: Kota Tsubouchi, Tokyo (JP); Teruhiko Teraoka, Tokyo (JP); Hidehito Gomi, Tokyo (JP); Junichi Sato, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 171 days.

(21) Appl. No.: 17/198,139

(22) Filed: Mar. 10, 2021

(65) Prior Publication Data
US 2022/0020368 A1    Jan. 20, 2022

(30) Foreign Application Priority Data
Mar. 19, 2020    (JP) .................................. 2020-050046

(51) Int. Cl.
*G10L 15/22* (2006.01)
*G10L 25/63* (2013.01)
*G10L 15/06* (2013.01)

(52) U.S. Cl.
CPC ............ *G10L 15/22* (2013.01); *G10L 15/063* (2013.01); *G10L 25/63* (2013.01)

(58) Field of Classification Search
CPC combination set(s) only.
See application file for complete search history.

(56) References Cited

U.S. PATENT DOCUMENTS

| 9,336,268 | B1* | 5/2016 | Moudy ................ G06N 3/0445 |
| 10,594,757 | B1* | 3/2020 | Shevchenko ............ G06F 40/35 |
| 10,937,334 | B2* | 3/2021 | Ryuzaki ................ G10L 13/033 |
| 11,038,974 | B1* | 6/2021 | Koukoumidis ..... G06F 16/3329 |
| 11,373,446 | B1* | 6/2022 | Beisel ..................... G06V 40/12 |
| 2016/0163332 | A1* | 6/2016 | Un .......................... G06F 40/30 704/260 |
| 2016/0191958 | A1* | 6/2016 | Nauseef ................. G06V 40/20 725/116 |
| 2016/0196836 | A1* | 7/2016 | Yu .......................... G10L 25/63 704/207 |

(Continued)

FOREIGN PATENT DOCUMENTS

| AU | 2013231030 A1 * | 4/2014 | ............... G06F 3/01 |
| BR | PI1011670 A2 * | 6/2010 | ........... G06F 3/0488 |

(Continued)

OTHER PUBLICATIONS

Japanese Patent Office, Notice of Reasons for Refusal, Application No. JP 2020-050046, dated Mar. 16, 2022, in 7 pages.

*Primary Examiner* — Mohammad K Islam
(74) *Attorney, Agent, or Firm* — Procopio, Cory, Hargreaves & Savitch LLP

(57) ABSTRACT

An output apparatus according to the present application includes an estimation unit, a decision unit, and an output unit. The estimation unit estimates an emotion of a user from detection information detected by a predetermined detection device. The decision unit decides information to be changed on the basis of the estimated emotion of the user. The output unit outputs information for changing the information to be changed.

10 Claims, 5 Drawing Sheets

(56) References Cited

U.S. PATENT DOCUMENTS

| | | | | |
|---|---|---|---|---|
| 2016/0240213 A1* | 8/2016 | Wen | | G10L 25/63 |
| 2018/0068226 A1* | 3/2018 | O'Connor | | G06F 40/35 |
| 2018/0150739 A1* | 5/2018 | Wu | | G06N 20/10 |
| 2018/0174020 A1* | 6/2018 | Wu | | G06F 16/338 |
| 2018/0322403 A1* | 11/2018 | Ron | | G06Q 10/10 |
| 2019/0012591 A1* | 1/2019 | Limsopatham | | G06N 3/0445 |
| 2020/0007380 A1* | 1/2020 | Chen | | H04L 51/02 |
| 2020/0349938 A1* | 11/2020 | Hwang | | G06F 40/30 |
| 2020/0404093 A1* | 12/2020 | Do | | H04L 67/535 |
| 2021/0043208 A1* | 2/2021 | Luan | | G10L 25/63 |
| 2021/0125610 A1* | 4/2021 | Cheung | | G06F 9/453 |
| 2021/0151058 A1* | 5/2021 | Cheung | | G02B 27/0172 |

FOREIGN PATENT DOCUMENTS

| | | | | | |
|---|---|---|---|---|---|
| CN | 105931638 | A | * | 9/2016 | G10L 15/22 |
| CN | 108039988 | A | * | 5/2018 | G06K 9/6256 |
| CN | 109274819 | A | * | 1/2019 | G10L 25/63 |
| CN | 112464018 | A | * | 3/2021 | G06F 16/636 |
| DE | 202017105815 | U1 | * | 1/2018 | G06F 16/3329 |
| JP | 2010-166324 | A | | 7/2010 | |
| JP | 2017-107078 | A | | 6/2017 | |
| JP | 2019-060921 | A | | 4/2019 | |
| KR | 20200013267 | A | * | 3/2016 | G10L 25/63 |
| WO | 2018061346 | A1 | | 4/2018 | |

\* cited by examiner

| DETECTION INFORMATION ID | DETECTION INFORMATION | EMOTION INFORMATION | TARGET UTTERANCE | ... |
|---|---|---|---|---|
| SE1 | DETECTION INFORMATION #1 | EMOTION INFORMATION #1 | TARGET UTTERANCE #1 | ... |
| SE2 | DETECTION INFORMATION #2 | EMOTION INFORMATION #2 | TARGET UTTERANCE #2 | ... |
| ... | ... | ... | ... | ... |

OUTPUT APPARATUS, OUTPUT METHOD AND NON-TRANSITORY COMPUTER-READABLE RECORDING MEDIUM

CROSS-REFERENCE TO RELATED APPLICATION(S)

The present application claims priority to and incorporates by reference the entire contents of Japanese Patent Application No. 2020-050046 filed in Japan on Mar. 19, 2020.

BACKGROUND OF THE INVENTION

1. Field of the Invention

The present invention relates to an output apparatus, an output method, and a non-transitory computer-readable recording medium.

2. Description of the Related Art

Conventionally, a voice dialogue device that searches for desired information from the Internet or controls home appliances in a home by voice dialogue has been known. For example, the voice dialogue device is a device that can use an artificial intelligence (AI) assistant function that supports a dialogue-type voice operation, and is called a smart speaker. A user acquires various information by dialoguing with the smart speaker.

However, in conventional technology described above, it is not always possible to appropriately remove information satisfying a predetermined condition. For example, in the conventional technology described above, it was not always possible to appropriately remove a voice that needs to be removed in consideration of the privacy of the user in a voice output by the smart speaker.

SUMMARY OF THE INVENTION

It is an object of the present invention to at least partially solve the problems in the conventional technology.

According to an example of a subject matter described in a present disclosure, an output apparatus includes an estimation unit that estimates an emotion of a user from detection information detected by a predetermined detection device, a decision unit that decides information to be changed on the basis of the estimated emotion of the user, and an output unit that outputs information for changing the information to be changed.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
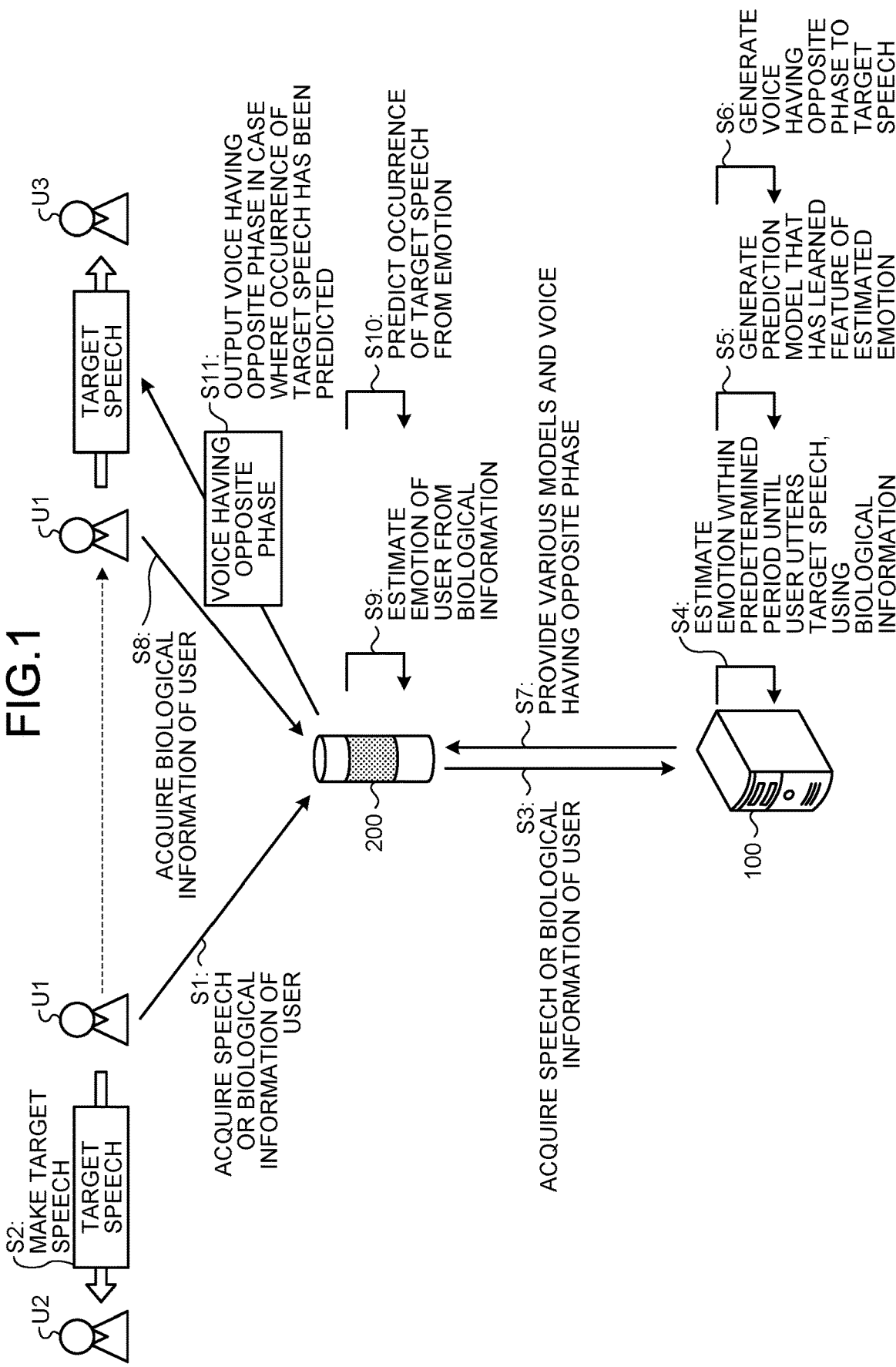
FIG. 1 is a diagram illustrating an example of output processing executed by an output apparatus according to an embodiment.

Hereinafter, a mode (hereinafter referred to as "an embodiment") for carrying out an output apparatus, an output method, and a non-transitory computer-readable recording medium according to the present application will be described in detail with reference to the drawings. Note that the output apparatus, the output method, and the non-transitory computer-readable recording medium according to the present application are not limited by this embodiment. In addition, the respective embodiments can be appropriately combined with each other as long as processing contents do not contradict each other. In addition, in each of the following embodiments, the same portions will be denoted by the same reference numerals, and an overlapping description thereof will be omitted.

1. Example of Output Processing Indicated by Output Apparatus

First, an example of output processing executed by an output apparatus 200 will be described with reference to FIG. 1. FIG. 1 is a diagram illustrating an example of output processing executed by an output apparatus 200 according to an embodiment. In the example of FIG. 1, an example in which users U1 to U3 are in conference is illustrated. In this case, it is assumed that the user U1 utters an insulting speech to the other users U2 and U3. Here, the output apparatus 200 executes processing for excluding the insulting speech. In addition, in the example of FIG. 1, it is assumed that the user U1 utters to the user U3 after a predetermined time has elapsed from a time when the user U1 utters to the user U2.

Note that the output apparatus 200 is an input/output apparatus that has a microphone acquiring an ambient sound and a speaker capable of outputting an arbitrary sound, and will be described as, for example, a device called a smart speaker.

Here, the output apparatus 200 acquires an emotion of the user U1, and specifies a range to be changed in the speech of the user U1 on the basis of the acquired emotion. For example, the output apparatus 200 specifies a speech portion having a context corresponding to the emotion of the user U1 as the range to be changed. Then, the output apparatus 200 outputs information for shielding the speech portion in the specified range.

As illustrated in FIG. 1, the output apparatus 200 acquires a speech or biological information of the user U1 (Step S1). For example, the output apparatus 200 acquires a voice indicated by a speech such as "User U2, you are ABCD!!!" as the speech of the user U1. In this case, the output apparatus 200 acquires waveform information of the voice indicating "User U2, you are ABCD!!!".

For example, it is assumed that a terminal device such as a wearable device is used by the user U1. In this case, the output apparatus 200 acquires biological information acquired from the wearable device as the biological information of the user U1. Here, the biological information may be any information regarding the user, and is, for example, information regarding a body temperature, odor, sweat, a heart rate, a brain wave, and the like.

For example, the wearable device acquires information regarding a heart rate of the user U1 at all times or intermittently (for example, every minute). Note that the wearable device may have any shape as long as it can communicate with the output apparatus 200. For example, the wearable device is a wearable device that can be worn on the ear, a wearable device that can be worn on a finger, a wristband type wearable device, or the like.

Subsequently, the user U1 makes a target speech to the user U2 (Step S2). For example, the user U1 utters the speech such as "User U2, you are ABCD!!!" to the user U2. Here, it is assumed that the target speech is "ABCD".

Then, an information processing device 100 acquires the speech and the biological information of the user from the output apparatus 200 (Step S3). For example, the information processing device 100 acquires the voice indicated by "User U2, you are ABCD!!!" as the speech of the user U1 from the output apparatus 200. In addition, the information processing device 100 acquires information regarding the heart rate of the user U1 as the biological information of the user U1.

Subsequently, the information processing device 100 estimates the emotion within a predetermined period until the user utters the target speech, using the biological information (Step S4). For example, the information processing device 100 generates an emotion estimation model that outputs a probability indicating to which emotion of happiness, anger, sadness, and joy the information regarding the heart rate corresponds in a case where the information regarding the heart rate has been input, by learning information regarding heart rates of each user and information regarding happiness, anger, sadness, and joy associated with the information regarding the heart rates using a conventional technology such as machine learning. Then, the information processing device 100 estimates the emotion of the user U1 by inputting information regarding the heart rate of the user U1 within a predetermined period until the target speech is uttered by the user U1 to the emotion estimation model. For example, the information processing device 100 estimates that the user U1 is angry using the emotion estimation model in a case where the heart rate was higher than a heart rate of the user U1 at normal times within a predetermined period. Note that estimation processing for estimating the emotion of the user by the information processing device 100 using the emotion estimation model has been described by way of example in the above example, but the present invention is not limited thereto. For example, the information processing device 100 may estimate the emotion of the user according to a policy in which the target speech and the emotion of the user are preset. For example, it is assumed that the target speech and information regarding the emotion of the user are stored in a database in advance in association with each other. In this case, the information processing device 100 determines whether or not the speech uttered by the user coincides with a target speech stored in the database. Then, the information processing device 100 may estimate the emotion stored in association with the target speech as the emotion of the user in a case where the speech uttered by the user coincides with the target speech stored in the database.

In addition, the information processing device 100 generates a prediction model that has learned a feature of the estimated emotion (Step S5). For example, the information processing device 100 generates a prediction model that outputs a probability that the target speech will be uttered when information regarding the estimated emotion of the user has been input, by learning the information regarding the estimated emotion of the user and the waveform information of the voice indicated by the target speech using a conventional technology such as machine learning.

In addition, the information processing device 100 may generate a prediction model that outputs a probability that the target speech will be uttered in a case where the information regarding the estimated emotion of the user and waveform information of a voice indicated by a pre-speech, which is a speech positioned before the target speech, have been input, by learning the information regarding the estimated emotion of the user, the waveform information of the voice indicated by the pre-speech, and the waveform information of the voice indicated by the target speech using a conventional technology such as machine learning.

In addition, the information processing device 100 generates a voice having an opposite phase to the target speech (Step S6). Specifically, the information processing device 100 generates waveform information having the opposite phase that cancels the waveform information of the voice indicated by the target speech in order to remove the target speech. For example, the information processing device 100 generates waveform information having the opposite phase from the waveform information of the voice indicated by the target speech "ABCD" by a conventional technology used for noise cancellation or the like.

Then, the information processing device 100 provides the output apparatus 200 with various models and the voice having the opposite phase (Step S7). For example, the information processing device 100 provides the output apparatus 200 with the emotion estimation model that outputs the probability indicating to which emotion of happiness, anger, sadness, and joy the information regarding the heart rate corresponds in a case where the information regarding the heart rate has been input, the prediction model that outputs the probability that the target speech will be uttered in a case where the information regarding the estimated emotion of the user has been input, and the waveform information having the opposite phase to the voice indicated by the target speech "ABCD". In addition, the information processing device 100 may provide the prediction model that outputs the probability that the target speech will be uttered in a case where the information regarding the estimated emotion of the user and the waveform information of the voice indicated by the pre-speech have been input.

In addition, a case where a predetermined time has elapsed from a time when the user U1 has made an utterance to the user U2 will be described. At this time, the output apparatus 200 acquires the biological information of the user U1 (Step S8). For example, the output apparatus 200 acquires biological information acquired from the wearable device used by the user U1 as the biological information of the user U1. For example, the output apparatus 200 acquires the information regarding the heart rate of the user U1 acquired at all times or intermittently by the wearable device.

Subsequently, the output apparatus 200 estimates the emotion of the user U1 from the biological information (Step S9). For example, the output apparatus 200 estimates that the user U1 is angry using the emotion estimation model in a case where the heart rate was higher than a heart rate of the user U1 at normal times within a predetermined period.

In addition, the output apparatus 200 predicts the occurrence of the target speech from the emotion (Step S10). For example, the output apparatus 200 outputs a probability that the target speech "ABCD" will be uttered by inputting information regarding the emotion of the user such as an emotion of the user U1 who is angry to the prediction model. Then, the output apparatus 200 determines that the target speech is uttered by the user U1 in a case where the probability that the target speech will be uttered is equal to or greater than a predetermined threshold value.

For example, it is assumed that the pre-speech is "you". In this case, the output apparatus 200 outputs a probability that the target speech "ABCD" will be uttered by inputting information regarding the emotion of the user such as an emotion of the user U1 who is angry and the waveform information of the voice indicated by "you" as the pre-speech to the prediction model. Then, the output apparatus 200 determines that the target speech is uttered by the user U1 in a case where the probability that the target speech will be uttered is equal to or greater than a predetermined threshold value.

Then, the output apparatus 200 outputs the voice having the opposite phase in a case where the occurrence of the target speech has been predicted (Step S11). For example, in a case where it has been determined that the target speech "ABCD" is uttered by the user U1, the information processing device 100 outputs waveform information having the opposite phase to the voice indicated by the target speech "ABCD" to the user U1. Therefore, the output apparatus 200 can selectively remove a voice corresponding to the target speech in the voice uttered by the user U1.

As such, the output apparatus 200 acquires information of a real world (reality) detected by various sensors as detection information, and constructs a detection world (sensed reality) from the acquired detection information. Then, the output apparatus 200 provides the user with a diminished world (diminished reality) in which a target satisfying a predetermined condition, such as the waveform information having the predetermined context among various targets (corresponding to targets in the real world) included in the detection world is erased or changed or the ease of recognition of the target is diminished, by various providing means. As a result, the output apparatus 200 can exclude information that the user does not want to recognize or the output apparatus 200 does not want the user to recognize from a recognition target of the user.

Conventionally, there was a case where it is difficult to appropriately remove a voice that needs to be removed in consideration of the privacy of the user in a voice output by the smart speaker. Therefore, the output apparatus 200 according to the embodiment solves a conventional problem by deciding information to be changed on the basis of an emotion of a user estimated from detection information detected by a predetermined detection device and outputting information for changing the information to be changed. Therefore, the output apparatus 200 can prevent the user from making a slip of the tongue, and can thus prevent production of meaningless friction between users.

2. Configuration of Output System

Figure 2:
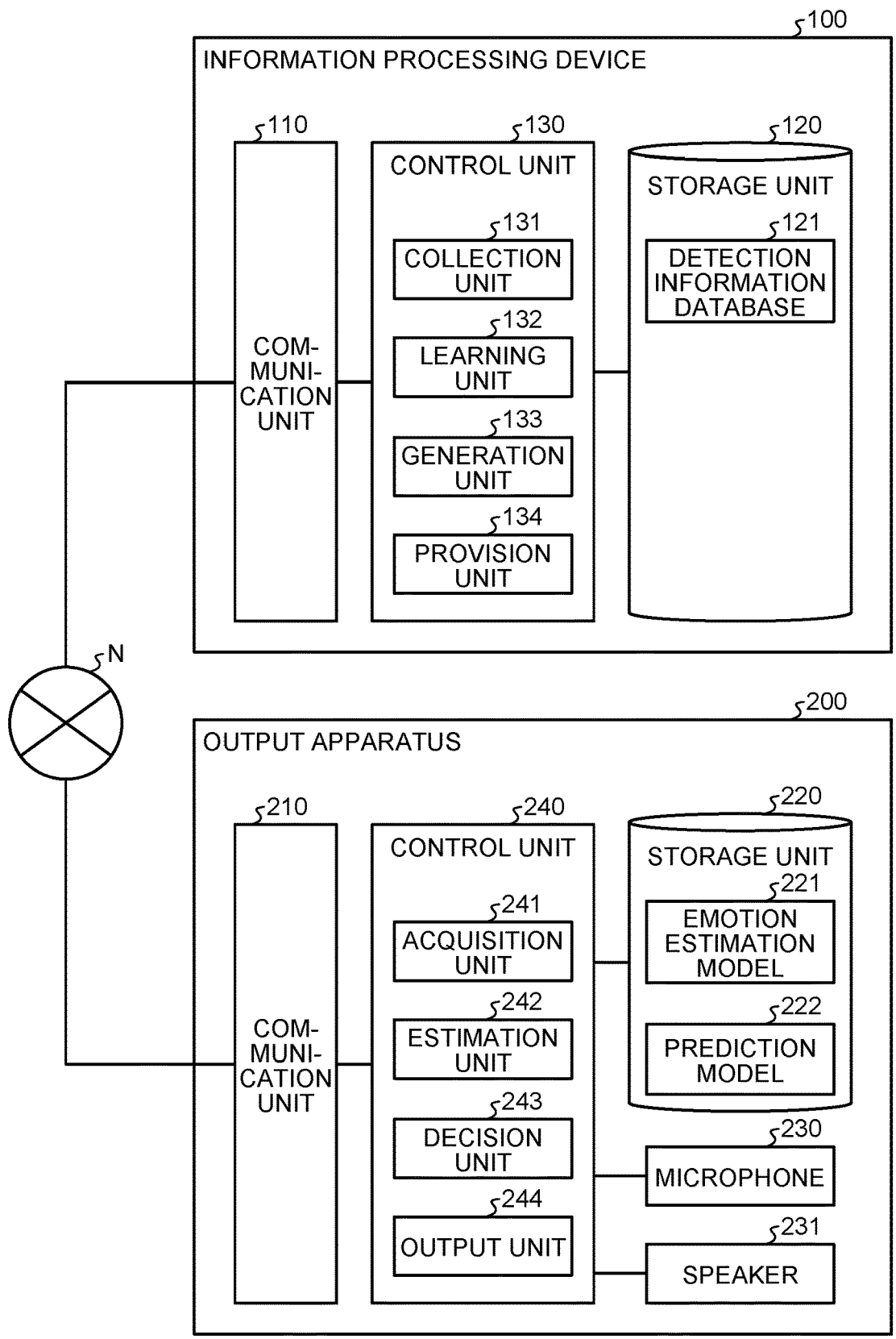
FIG. 2 is a diagram illustrating a configuration example of an output system according to the embodiment.

As illustrated in FIG. 2, an output system 1 includes an information processing device 100 and an output apparatus 200. The information processing device 100 and the output apparatus 200 are communicably connected to each other in a wired or wireless manner via a network N. Note that the output system 1 illustrated in FIG. 2 may include a plurality of information processing devices 100 or a plurality of output apparatuses 200.

The information processing device 100 according to the embodiment is an information processing device capable of communicating with various devices via a predetermined network N such as the Internet, and is realized by, for example, a server device, a cloud system or the like. For example, the information processing device 100 is communicably connected to various other devices via the network N.

The output apparatus 200 according to the embodiment is an information processing device having a voice recognition function, a voice reproduction function, a voice synthesis function, a voice response function, and the like, and is, for example, a smart speaker or the like. In addition, the output apparatus 200 is communicably connected to various other devices via the network N.

In addition, the output apparatus 200 is a device that can realize output of music or provision of information by a voice. In addition, the output apparatus 200 has an acquisition function of acquiring a sound, and has an output function of outputting a sound according to a content of an acquired voice when a voice uttered by the user is acquired.

3. Configuration of Information Processing Device

Hereinafter, an example of a functional configuration of the information processing device 100 described above will be described. FIG. 2 is a diagram illustrating a configuration example of the information processing device 100 according to the embodiment. As illustrated in FIG. 2, the information processing device 100 includes a communication unit 110, a storage unit 120, and a control unit 130.

Communication Unit 110

The communication unit 110 is realized by, for example, a network interface card (NIC) or the like. Then, the communication unit 110 is connected to the network N in a wired or wireless manner, and transmits and receives information to and from the output apparatus 200.

Storage Unit 120

The storage unit 120 is realized by, for example, a semiconductor memory element such as a random access memory (RAM), a flash memory or the like, or a storage device such as a hard disk, an optical disk or the like. In addition, the storage unit 120 has a detection information database 121.

Detection Information Database 121

Figures 3, 4:
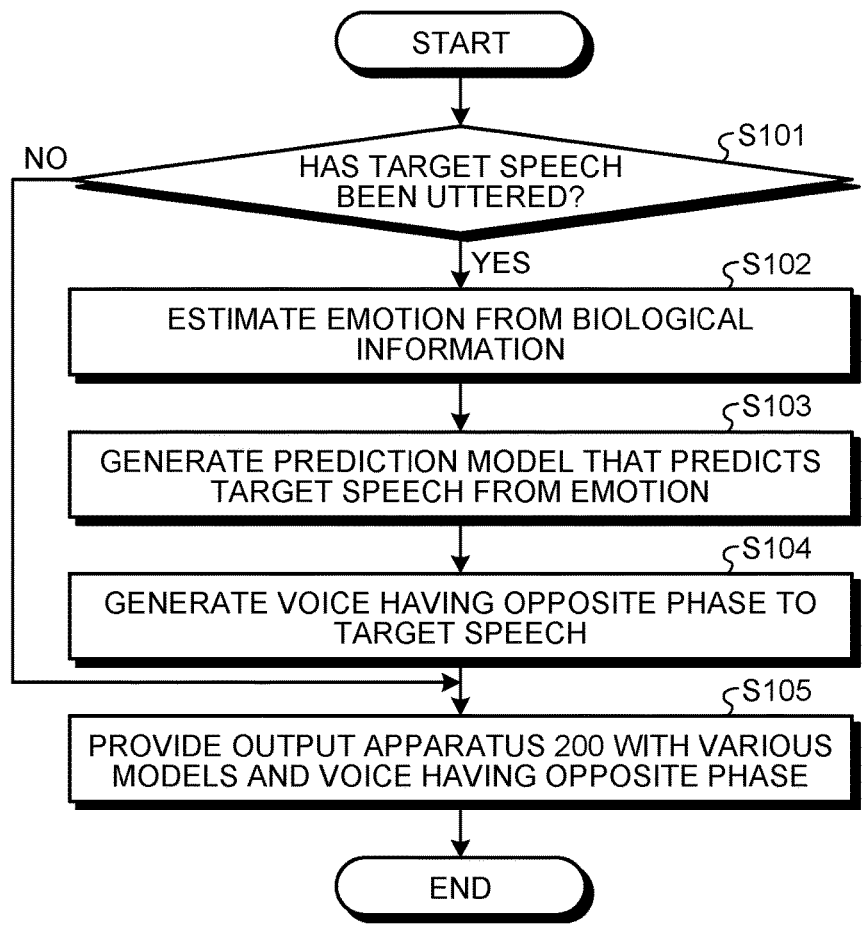
FIG. 3 is a diagram illustrating an example of a speech history database according to the embodiment.
FIG. 4 is a flowchart illustrating an example of a flow of information processing executed by an information processing device according to the embodiment.

The detection information database 121 stores detection information detected from the user. Here, FIG. 3 illustrates an example of the detection information database 121 according to the embodiment. In the example illustrated in FIG. 3, the detection information database 121 has items such as a "detection information identifier (ID)", "detection information", "emotion information", and "target speech".

The "detection information ID" is an identifier that identifies the detection information detected from the user. The "detection information" is detection information detected from the user associated with the "detection information ID". For example, the detection information is voice information regarding a voice indicated by a speech, biological information, position information, and the like, detected from the user. In addition, the detection information may include time information regarding a time when the voice information, the biological information, and the position information have been detected.

The "emotion information" is information regarding an emotion of the user estimated on the basis of the detection information detected from the user associated with the "detection information ID". For example, the emotion information is information regarding happiness, anger, sadness, and joy of the user, or the like. The "target speech" is voice information indicating a target speech uttered by the user associated with the "detection information ID". For example, the target speech is a speech or the like corresponding to personal information of another user different from the user or a content that insults or discriminates another user.

For example, in FIG. 3, in "SE1" identified by the detection information ID, the detection information is "detection information #1", the emotion information is "emotion information #1", and the target speech is "target speech #1". Note that the detection information, the emotion information, and the target speech have been represented by abstract codes in the example illustrated in FIG. 3, but the detection information, the emotion information, and the target speech may be specific numerical values, specific file formats or the like. In addition, the detection information database 121 may store not only the above items but also feature information indicating a feature of the speech uttered by the user, attribute information regarding an attribute of the user estimated on the basis of the detection information, or the like.

Control Unit 130

The control unit 130 is a controller, and is realized by, for example, executing various programs stored in a storage device in the information processing device 100 using a RAM as a work area by a central processing unit (CPU), a micro processing unit (MPU), or the like. In addition, the control unit 130 is a controller, and is realized by, for example, an integrated circuit such as an application specific integrated circuit (ASIC), a field programmable gate array (FPGA) or the like.

As illustrated in FIG. 2, the control unit 130 includes a collection unit 131, a learning unit 132, a generation unit 133, and a provision unit 134, and realizes or executes functions or actions of information processing to be described below. Note that an internal configuration of the control unit 130 is not limited to a configuration illustrated in FIG. 2, and may be another configuration as long as it is a configuration for performing information processing to be described later. In addition, a connection relationship between respective processing units included in the control unit 130 is not limited to a connection relationship illustrated in FIG. 2, and may be another connection relationship.

Collection Unit 131

The collection unit 131 collects various information. Specifically, the collection unit 131 collects voice information or biological information of the user. For example, the collection unit 131 acquires the voice indicated by "User U2, you are ABCD!!!" as the speech of the user U1 from the output apparatus 200. In addition, the collection unit 131 acquires information regarding the heart rate of the user U1 as the biological information of the user U1.

Learning Unit 132

The learning unit 132 generates a learning model using various information. Specifically, for example, the learning unit 132 generates an emotion estimation model 221 that outputs a probability indicating to which emotion of happiness, anger, sadness, and joy the information regarding the heart rate corresponds in a case where the information regarding the heart rate has been input, by learning information regarding heart rates of each user and information regarding happiness, anger, sadness, and joy associated with the information regarding the heart rates using a conventional technology such as machine learning, with reference to the detection information database 121. Then, the learning unit 132 estimates the emotion of the user U1 by inputting information regarding the heart rate of the user U1 within a predetermined period until the target speech is uttered by the user U1 to the emotion estimation model 221. For example, the learning unit 132 estimates that the user U1 is angry using the emotion estimation model 221 in a case where the heart rate was higher than a heart rate of the user U1 at normal times within a predetermined period. Then, the learning unit 132 stores the estimated emotion information in the detection information database 121.

In addition, the learning unit 132 generates a prediction model 222 that outputs a probability that the target speech will be uttered in a case where the estimated emotion information of the user has been input by learning the estimated emotion information of the user and the waveform information of the voice indicated by the target speech using a conventional technology such as machine learning with reference to the detection information database 121.

In addition, the learning unit 132 generates a prediction model 222 that outputs a probability that the target speech will be uttered in a case where the estimated emotion information of the user and the waveform information of the voice indicated by the pre-speech have been input by learning the estimated emotion information of the user, the waveform information of the voice indicated by the pre-speech, and the waveform information of the voice indicated by the target speech using a conventional technology such as machine learning.

In addition, the learning unit 132 may cause a predetermined learning model to learn various information. Specifically, the learning unit 132 may cause the prediction model 222 that outputs the probability that the target speech will be uttered in a case where the estimated emotion information of the user has been input to learn newly estimated emotion information of the user and waveform information of a voice indicated by a newly acquired target speech with reference to the detection information database 121.

Note that the prediction model 222 in the embodiment is not limited to the above example. For example, the learning unit 132 may generate a prediction model 222 by learning a speech content indicated by the voice instead of the waveform information of the voice.

For example, the learning unit 132 estimates a speech content indicated by the target speech by analyzing the speech content indicated by the target speech using a conventional technology such as a morpheme analysis, a syntax analysis, or a semantic analysis. Then, the learning unit 132 may generate a prediction model 222 that outputs a probability that the target speech will be uttered in a case where the estimated emotion information of the user has been input by learning the estimated emotion information of the user and the speech content indicated by the target speech. Note that the learning unit 132 does not need to be limited to processing for generating the prediction model 222 that outputs the probability that the target speech will be uttered, and may generate, for example, a prediction model 222 that outputs the speech content indicated by the target speech.

Generation Unit 133

The generation unit 133 generates various information. Specifically, the generation unit 133 generates waveform information having the opposite phase that cancels the waveform information of the voice indicated by the target speech in order to remove the target speech. For example, the generation unit 133 generates waveform information having the opposite phase from the waveform information of the voice indicated by the target speech "ABCD" by a conventional technology used for noise cancellation or the like.

Provision Unit 134

The provision unit 134 provides various information. Specifically, the provision unit 134 provides the output apparatus 200 with various models and the voice having the opposite phase. For example, the provision unit 134 provides the output apparatus 200 with the emotion estimation model 221 that outputs the probability indicating to which emotion of happiness, anger, sadness, and joy the information regarding the heart rate corresponds in a case where the information regarding the heart rate has been input, the prediction model 222 that outputs the probability that the target speech will be uttered in a case where the information regarding the estimated emotion of the user has been input, and the waveform information having the opposite phase to the voice indicated by the target speech "ABCD". In addition, the provision unit 134 may provide the prediction model 222 that outputs the probability that the target speech will be uttered in a case where the information regarding the estimated emotion of the user and the waveform information of the voice indicated by the pre-speech have been input.

4. Configuration of Output Apparatus

Hereinafter, an example of a functional configuration of the output apparatus 200 described above will be described. FIG. 2 is a diagram illustrating a configuration example of the output apparatus 200 according to the embodiment. As illustrated in FIG. 2, the output apparatus 200 includes a communication unit 210, a storage unit 220, a microphone 230, a speaker 231 and a control unit 240.

Communication Unit 210

The communication unit 210 is realized by, for example, a NIC or the like. Then, the communication unit 210 is connected to the network N in a wired or wireless manner, and transmits and receives information to and from the information processing device 100.

Storage Unit 220

The storage unit 220 is realized by, for example, a semiconductor memory element such as a RAM, a flash memory, or the like, or a storage device such as a hard disk, an optical disk or the like. In addition, the storage unit 220 has the emotion estimation model 221 and the prediction model 222. For example, the emotion estimation model 221 is an emotion estimation model that outputs a probability indicating to which emotion of happiness, anger, sadness, and joy the biological information of the user corresponds in a case where the biological information of the user has been input, or the like. The prediction model 222 is a prediction model that outputs a probability that the target speech will be uttered in a case where the estimated emotion information of the user has been input, or the like.

Microphone 230

The microphone 230 acquires various sounds and voices. For example, the microphone 230 acquires an ambient sound. In addition, the microphone 230 acquires a voice uttered by the user positioned in the surrounding.

Speaker 231

The speaker 231 outputs various sounds and voices. For example, the speaker 231 outputs an arbitrary sound and voice. In addition, the speaker 231 outputs a voice having an opposite phase.

Control Unit 240

The control unit 240 is a controller, and is realized by, for example, executing various programs (corresponding to an example of an output program) stored in a storage device in the output apparatus 200 using a RAM as a work area by a CPU, an MPU, or the like. In addition, the control unit 240 is a controller, and is realized by an integrated circuit such as an ASIC, an FPGA or the like.

As illustrated in FIG. 2, the control unit 240 includes an acquisition unit 241, an estimation unit 242, a decision unit 243, and an output unit 244, and realizes or executes functions or actions of information processing to be described below. Note that an internal configuration of the control unit 240 is not limited to a configuration illustrated in FIG. 2, and may be another configuration as long as it is a configuration for performing information processing to be described later. In addition, a connection relationship between respective processing units included in the control unit 240 is not limited to a connection relationship illustrated in FIG. 2, and may be another connection relationship.

Acquisition Unit 241

The acquisition unit 241 acquires various information. Specifically, the acquisition unit 241 acquires the voice information or the biological information of the user. For example, the acquisition unit 241 acquires the voice indicated by the speech such as "User U2, you are ABCD!!!" as the speech of the user U1. In this case, the output apparatus 200 acquires waveform information of the voice indicating "User U2, you are ABCD!!!".

For example, it is assumed that a terminal device such as a wearable device is used by the user U1. In this case, the acquisition unit 241 acquires biological information acquired from the wearable device as the biological information of the user U1. For example, the wearable device acquires information regarding a heart rate of the user U1 at all times or intermittently.

Estimation Unit 242

The estimation unit 242 estimates various information. Specifically, the estimation unit 242 estimates the emotion of the user from the detection information detected by the predetermined detection device. For example, the estimation unit 242 estimates that the user U1 is angry using the emotion estimation model 221 in a case where the heart rate was higher than a heart rate of the user U1 at normal times within a predetermined period.

In addition, the estimation unit 242 may estimate the emotion from the biological information of the user who has uttered the voice in a case where voice information satisfying a predetermined condition has been detected. For example, the estimation unit 242 may estimate the emotion from the biological information of the user who has uttered the voice in a case where an amplitude of the voice indicated by the speech uttered by the user is equal to or greater than a predetermined threshold value. Here, the estimation unit 242 may estimate that the user is angry using the emotion estimation model 221 in a case the user who has uttered the voice has a heart rate higher than a heart rate of the user at normal times.

Note that the embodiment does not need to be limited to the above example, and the estimation unit 242 may estimate the emotion of the user without using the emotion estimation model 221. For example, the estimation unit 242 may estimate the emotion of the user on the basis of the biological information acquired from the user who has uttered the voice. As a more specific example, the estimation unit 242 may estimate that the user is angry in a case where the user has a heart rate higher than a heart rate at normal times. In addition, the estimation unit 242 may estimate a plurality of emotions that have fluctuated in a case where the emotion of the user has fluctuated with time for a predetermined period.

In addition, the estimation unit 242 may estimate an emotion of a reception side user, who is another user who is talking with the user, from biological information of the reception side user. For example, it is assumed that a terminal device such as a wearable device is used by the reception side user. In this case, the estimation unit 242 estimates the emotion of the reception side user from biological information acquired from the wearable device as the biological information of the reception side user. Here, it is assumed that perspiration of the reception side user is detected. In this case, the estimation unit 242 may estimate that the reception side user is nervous or is sad using the emotion estimation model 221 in a case where a perspiration amount of the reception side user has been higher than that at normal times.

Decision Unit 243

The decision unit 243 decides various information. Specifically, the decision unit 243 decides information to be changed on the basis of the emotion of the user estimated by the estimation unit 242. For example, the decision unit 243 outputs a probability that the target speech "ABCD" will be uttered by inputting emotion information of the user such as an emotion of the user U1 who is angry to the prediction model 222. Then, the decision unit 243 determines that the target speech is uttered by the user U1 in a case where the probability that the target speech will be uttered is equal to or greater than a predetermined threshold value.

For example, it is assumed that the pre-speech is "you". In this case, the decision unit 243 outputs a probability that the target speech "ABCD" will be uttered by inputting information regarding the emotion of the user such as an emotion of the user U1 who is angry and the waveform information of the voice indicated by "you" as the pre-speech to the prediction model 222. Then, the decision unit 243 determines that the target speech is uttered by the user U1 in a case where the probability that the target speech will be uttered is equal to or greater than a predetermined threshold value.

In addition, the decision unit 243 may predict the speech of the user on the basis of the estimated emotion of the user and decide a speech satisfying a predetermined condition in the predicted speech as a speech to be changed. For example, it is assumed that the user U1 and the user U2 are talking with each other. In this case, the decision unit 243 predicts that a speech "You are bad in terms of ABCD" will be uttered to the user U2 by the user U1 in a case where the user U1 is angry. Then, the decision unit 243 decides a speech "ABCD" in the speech "You are bad in terms of ABCD" as a target speech.

In addition, the decision unit 243 may decide the information to be changed in a case where the emotion of the user satisfies a predetermined condition. For example, the decision unit 243 may decide the information to be changed in a case where the emotion of the user is a negative emotion as the predetermined condition. As a more specific example, the decision unit 243 decides that the emotion of the user is negative in a case where the emotion of the user U1 is angry. Then, the decision unit 243 outputs a probability that the target speech "ABCD" will be uttered by inputting emotion information of the user such as the emotion of the user U1 who is angry to the prediction model 222. Then, the decision unit 243 determines that the target speech is uttered by the user U1 in a case where the probability that the target speech will be uttered is equal to or greater than a predetermined threshold value.

The embodiment does not need to be limited to the above example, and the decision unit 243 may decide a speech of the reception side user as the speech to be changed on the basis of the estimated emotion of the reception side user. For example, it is assumed that the reception side user, who is another user who is talking with the user, is angry from the biological information of the reception side user. In this case, the decision unit 243 outputs a probability that the target speech "ABCD" will be uttered by inputting emotion information of the reception side user such as an emotion of the reception side user who is angry to the prediction model 222. Then, the decision unit 243 determines that the target speech is uttered by the reception side user in a case where the probability that the target speech will be uttered is equal to or greater than a predetermined threshold value.

Output Unit 244

The output unit 244 outputs various information. Specifically, the output unit 244 outputs information for changing the information to be changed. For example, in a case where it has been determined that the target speech "ABCD" is uttered by the user U1, the output unit 244 outputs the waveform information having the opposite phase to the voice indicated by the target speech "ABCD" to the user U1. Therefore, the output unit 244 can selectively remove a voice corresponding to the target speech in the voice uttered by the user U1.

5. Processing Procedure (1)

Next, a procedure of information processing executed by the information processing device 100 according to the embodiment will be described with reference to FIG. 4. FIG. 4 is a flowchart illustrating an example of a flow of information processing executed by the information processing device 100 according to the embodiment.

As illustrated in FIG. 4, the learning unit 132 determines whether or not the target speech has been uttered (Step S101). Specifically, in a case where the learning unit 132 has determined that the target speech has not been uttered (Step S101: No), the learning unit 132 proceeds to Step S105.

On the other hand, in a case where the learning unit 132 has determined that the target speech has been uttered (Step S101: Yes), the learning unit 132 estimates the emotion from the biological information (Step S102). In addition, the learning unit 132 generates the prediction model 222 that predicts the target speech from the estimated emotion (Step S103).

Then, the generation unit 133 generates a voice having an opposite phase to the target speech (Step S104). Then, the provision unit 134 provides the output apparatus 200 with various models and the voice having the opposite phase (Step S105).

6. Processing Procedure (2)

Figure 5:
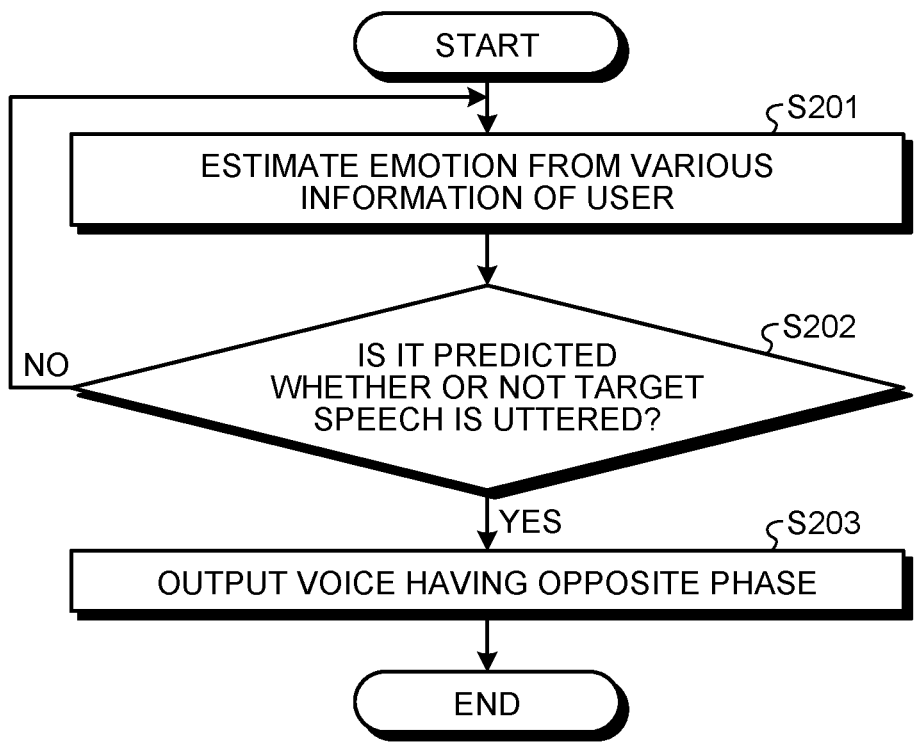
FIG. 5 is a flowchart illustrating an example of a flow of output processing executed by the output apparatus according to the embodiment.

Next, a procedure of output processing executed by the output apparatus 200 according to the embodiment will be described with reference to FIG. 5. FIG. 5 is a flowchart illustrating an example of a flow of output processing executed by the output apparatus 200 according to the embodiment.

As illustrated in FIG. 5, the estimation unit 242 estimates an emotion from various information of the user (Step S201). Then, the decision unit 243 predicts whether or not the target speech will be uttered (Step S202). Specifically, in a case where the decision unit 243 has predicted that the target speech will not be uttered (Step S202: No), the decision unit 243 returns to a step before Step S201.

On the other hand, in a case where the decision unit 243 has predicted that the target speech will be uttered (Step S202: Yes), the output unit 244 outputs a voice having an opposite phase (Step S203).

7. Modification

The information processing device 100 and the output apparatus 200 described above may be implemented in various different forms other than the above embodiment. Therefore, other embodiments of the information processing device 100 and the output apparatus 200 will hereinafter be described.

7-1. Application Example

An example in which the user U1 to U3 are in conference has been described in the above embodiment, but the present invention is not limited thereto. For example, the above embodiment is also applied to an application for performing a remote conference via a network, a chat application, and the like.

For example, it is assumed that the user U1 utters an insulting speech to the user U2 on the application for performing the remote conference. At this time, it is assumed that the insulting speech uttered to the user U2 by the user U1 is transmitted to the user U2 via the network. In this case, the output apparatus 200 executes processing for excluding the insulting speech uttered by the user U1.

For example, the output apparatus 200 may change the insulting speech uttered to the user U2 by the user U1 into an appropriate speech and output the changed speech to the user U2 via the network. Here, the appropriate speech may be any speech as long as it does not include an insulting content. For example, the output apparatus 200 may change the insulting speech to an appropriate speech "wise" in a case where the insulting speech is "stupid". As such, the output apparatus 200 may change a negative speech such as the insulting speech into a positive speech. In addition, the output apparatus 200 may lower a volume of a speech corresponding to the insulting speech, muting the speech, or applying a mosaic to a voice, and output a speech subjected to such processing to the user U2 via the network. In addition, the output apparatus 200 may perform processing such as processing for hiding the face of the user U1 who has uttered the insulting speech.

Note that an example in which the output apparatus 200 executes the processing for excluding the insulting speech uttered to the user U2 by the user U1 has been described in the above example, but the present invention is not limited thereto. For example, the output apparatus 200 may acquire a speech uttered by the user U1 and perform processing for excluding a speech uttered by the user U1 at a second time or later and insulting the user U2 using an emotion estimation model and a prediction model that have learned such a speech. In this case, the output apparatus 200 may perform processing for excluding the insulting speech uttered by the user U1 in advance and output such a speech to the user U3, when the user U1 utters to the user U3 who is a user different from the user U2. Therefore, the output apparatus 200 can prevent the user U1 from repeatedly uttering the insulting speech to another user.

For example, it is assumed that the user U1 transmits an insulting text to the user U2 on the chat application. In this case, the output apparatus 200 executes processing for excluding the insulting text transmitted by the user U1. For example, the output apparatus 200 may change the insulting text transmitted to the user U2 by the user U1 into an appropriate text and output the changed text to the user U2. For example, the output apparatus 200 may change the insulting speech to an appropriate speech "you have acting power" in a case where the insulting text is "you are restless". As such, the output apparatus 200 may change a negative speech such as the insulting speech into a positive speech.

In addition, the output apparatus 200 may also erase a text corresponding to the insulting text, or may erase a group of chats including the insulting text. In this case, the output apparatus 200 may output a fixed form sentence or the like instead of the deleted chat to the user U2. Here, the fixed form sentence may be any fixed form sentence as long as a content thereof does not include an insulting content and does not change a context of the chat. For example, the output apparatus 200 may change an insulting speech to the fixed form sentence "Today's weather is good" in a case where the insulting speech is "You lack understanding and do not listen to people" Therefore, the output apparatus 200 can reduce production of meaningless friction between the users.

7-2. Target Speech

An example in which the speech uttered by the user and insulting another user is the target speech have been described in the above embodiment, but the output processing described in the above embodiment may be applied to, for example, a speech including personal information of another user uttered by the user.

7-3. Output Direction

An example in which the output apparatus 200 outputs the waveform information having the opposite phase to the predetermined waveform information in a case where it has been predicted that the predetermined waveform information will be generated has been described in the above embodiment, but the present invention is not limited thereto. For example, the output apparatus 200 may limit a direction in which it outputs the voice having the opposite phase. In this case, the output apparatus 200 may output the voice having the opposite phase only in a direction in which the user utters the target speech. Note that the voice having the opposite phase may have a directivity.

7-4. Output Apparatus

The output apparatus 200 has been described as an example of the smart speaker in the above embodiment, but the output apparatus 200 may be any information processing device as long as it has a voice reproduction function. Specifically, the output apparatus 200 may be a terminal device used by a user who accesses a content such as a web page displayed on a browser or a content for an application.

For example, the output apparatus 200 may be a desktop personal computer (PC), a notebook PC, a tablet terminal, a mobile phone, a personal digital assistant (PDA), a smartwatch, a wearable device, or the like. For example, the output apparatus 200 may be provided with a movable pulley or the like to self-travel.

7-5. Voice

The voice indicated by the speech uttered by the user has been described by way of example in the above embodiment, but the output processing described in the above embodiment may be applied to, for example, vibrations such as fragrance, light, an electromagnetic wave, and an earthquake, instead of the voice. In addition, the output processing described in the above embodiment may be applied to information or the like such as a text on a chat application instead of the voice.

7-6. Program

Figure 6:
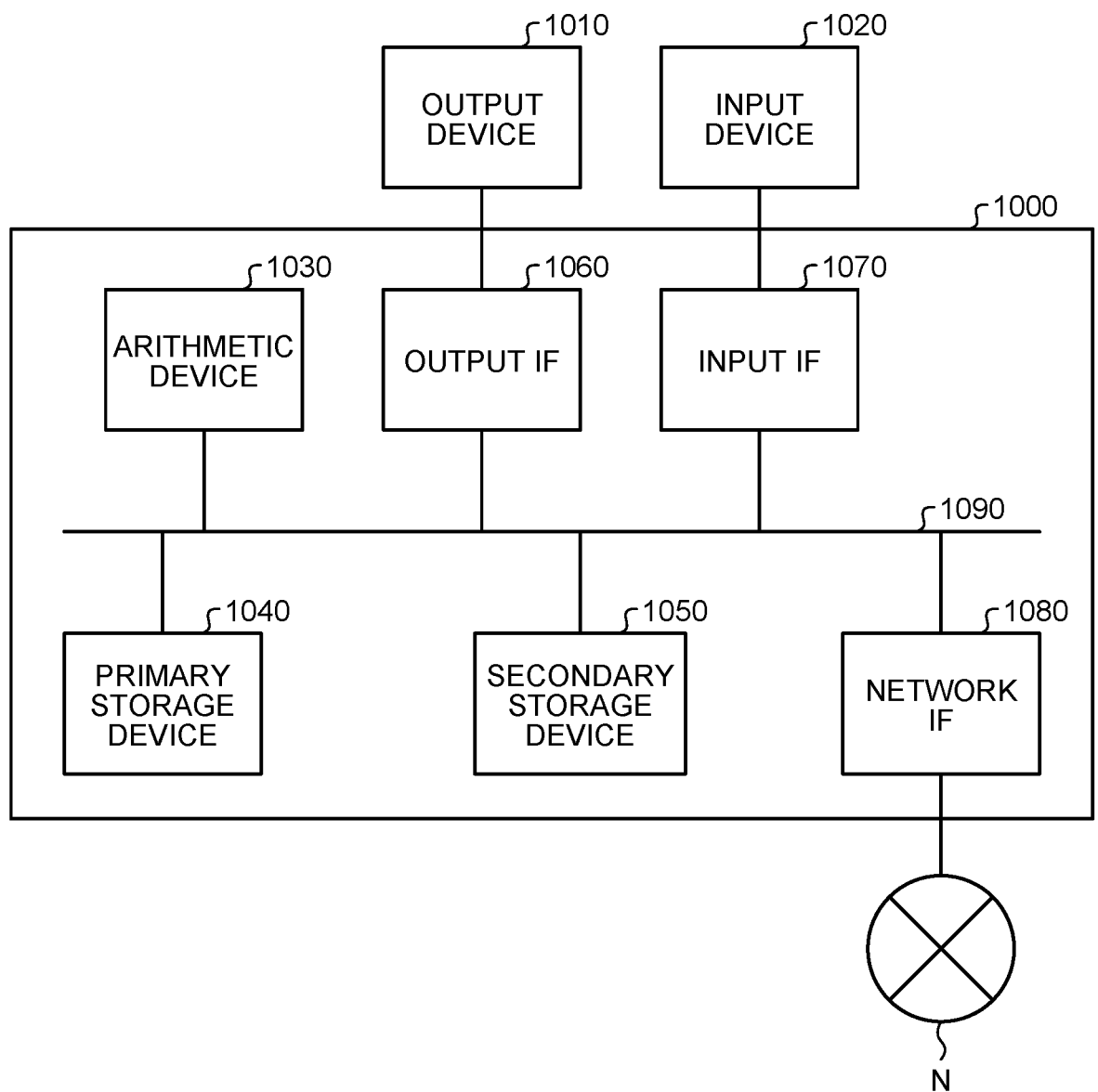
FIG. 6 is a hardware configuration diagram illustrating an example of a computer that realizes a function of the output apparatus.

In addition, the output apparatus 200 according to the embodiment described above is realized by, for example, a computer 1000 having a configuration as illustrated in FIG. 6. FIG. 6 is a diagram illustrating an example of a hardware configuration. The computer 1000 is connected to an output apparatus 1010 and an input device 1020, and has a form in which an arithmetic device 1030, a primary storage device 1040, a secondary storage device 1050, an output interface (IF) 1060, an input IF 1070, and a network IF 1080 are connected to each other by a bus 1090.

The arithmetic device 1030 operates on the basis of a program stored in the primary storage device 1040 or the secondary storage device 1050, a program read from the input device 1020, or the like, and executes various processing. The primary storage device 1040 is a memory device that primarily stores data used by the arithmetic device 1030 for various calculations, such as a RAM. In addition, the secondary storage device 1050 is a storage device in which data used by the arithmetic device 1030 for various calculations or various databases are registered, and is realized by, a read only memory (ROM), a hard disk drive (HDD), a flash memory, or the like.

The output IF 1060 is an interface for transmitting target information to be output to the output apparatus 1010 that outputs various information, such as a monitor and a printer, and is realized by, for example, a connector of a standard such as a universal serial bus (USB), a digital visual interface (DVI), and a high definition multimedia interface (HDMI) (registered trademark). In addition, the input IF 1070 is an interface for receiving information from various input devices 1020 such as a mouse, a keyboard, and a scanner, and is realized by, for example, a USB.

Note that the input device 1020 may be, for example, a device that reads information from an optical recording medium such as a compact disc (CD), a digital versatile disc (DVD), or a phase change rewritable disk (PD), a magneto-optical recording medium such as a magneto-optical disk (MO), a tape medium, a magnetic recording medium, a semiconductor memory, or the like. In addition, the input device 1020 may be an external storage medium such as a USB memory.

The network IF 1080 receives data from another apparatus via the network N and sends the received data to the arithmetic device 1030, and also transmits data generated by the arithmetic device 1030 to another device via the network N.

The arithmetic device 1030 controls the output apparatus 1010 or the input device 1020 via the output IF 1060 or the input IF 1070. For example, the arithmetic device 1030 loads a program from the input device 1020 or the secondary storage device 1050 onto the primary storage device 1040, and executes the loaded program.

For example, in a case where the computer 1000 functions as the output apparatus 200, the arithmetic device 1030 of the computer 1000 realizes a function of the control unit 40 by executing the program loaded onto the primary storage device 1040.

7-7. Others

In addition, all or some of the processing described as being automatically performed among the respective processing described in the embodiment and the modification described above can be manually performed or all or some of the processing described as being manually performed among the respective processing described in the embodiment and the modification described above can be automatically performed by a known method. In addition, processing procedures, specific names, and information including various data or parameters illustrated in the above document or the drawings can be arbitrarily changed unless otherwise specified. For example, various information illustrated in each drawing is not limited to the illustrated information.

In addition, each component of the respective devices that are illustrated is a functional concept, and does not necessarily have to be physically configured as illustrated. That is, specific forms of distribution and integration of the respective devices are not limited to those illustrated, and all or some of the devices can be configured to be functionally or physically distributed and integrated in any unit according to various loads, use situations or the like. For example, the information processing device 100 and the output apparatus 200 may be integrated with each other to configure an output apparatus.

In addition, the embodiment and the modification described above can be appropriately combined with each other within as long as processing contents do not contradict each other.

In addition, the "unit" described above can be replaced with a "means" or a "circuit". For example, the output unit can be replaced with an output means or an output circuit.

8. Effect

As described above, the output apparatus 200 according to the embodiment includes the estimation unit 242, the decision unit 243, and the output unit 244. The estimation unit 242 estimates the emotion of the user from the detection information detected by the predetermined detection device. The decision unit 243 decides the information to be changed on the basis of the estimated emotion of the user. The output unit 244 outputs the information for changing the detection information to be changed.

Therefore, the output apparatus 200 according to the embodiment decides the information to be changed on the basis of the emotion of the user estimated from the detection information detected by the predetermined detection device and outputs the information for changing the detection information to be changed, and can thus remove appropriately the information satisfying the predetermined condition.

In addition, in the output apparatus 200 according to the embodiment, the decision unit 243 decides the speech to be changed on the basis of the estimated emotion of the user.

Therefore, the output apparatus 200 according to the embodiment decides the speech to be changed on the basis of the estimated emotion of the user, and can thus remove appropriately the information satisfying the predetermined condition.

In addition, in the output apparatus 200 according to the embodiment, the decision unit 243 predicts the speech of the user on the basis of the estimated emotion of the user and decides the speech satisfying the predetermined condition in the predicted speech as the speech to be changed.

In addition, the output apparatus 200 according to the embodiment predicts the speech of the user on the basis of the estimated emotion of the user and decides the speech satisfying the predetermined condition in the predicted speech as the speech to be changed, and can thus remove appropriately the information satisfying the predetermined condition.

In addition, in the output apparatus 200 according to the embodiment, the estimation unit 242 estimates an emotion of an utterance side user who utters the speech from the detection information, and the decision unit 243 decides the speech of the utterance side user as the speech to be changed on the basis of the estimated emotion of the utterance side user.

Therefore, the output apparatus 200 according to the embodiment decides the speech of the utterance side user as the speech to be changed on the basis of the emotion of the utterance side user estimated from the detection information, and can thus remove appropriately the information satisfying the predetermined condition.

In addition, in the output apparatus 200 according to the embodiment, the estimation unit 242 estimates the emotion of the reception side user who receives the speech from the detection information, and the decision unit 243 decides the speech of the reception side user as the speech to be changed on the basis of the estimated emotion of the reception side user.

Therefore, the output apparatus 200 according to the embodiment decides the speech of the reception side user as the speech to be changed on the basis of the emotion of the reception side user estimated from the detection information, and can thus remove appropriately the information satisfying the predetermined condition.

In addition, in the output apparatus 200 according to the embodiment, the decision unit 243 decides the information to be changed in a case where the emotion of the user satisfies the predetermined condition.

Therefore, the output apparatus 200 according to the embodiment decides the information to be changed in a case where the emotion of the user satisfies the predetermined condition, and can thus remove appropriately the information satisfying the predetermined condition.

In addition, in the output apparatus 200 according to the embodiment, the decision unit 243 decides the information to be changed in a case where the emotion of the user is a negative emotion as the predetermined condition.

Therefore, the output apparatus 200 according to the embodiment decides the information to be changed in a case where the emotion of the user is the negative emotion as the predetermined condition, and can thus remove appropriately the information satisfying the predetermined condition.

In addition, in the output apparatus 200 according to the embodiment, the decision unit 243 predicts the speech of the user on the basis of the estimated emotion of the user and decides the predicted speech as the speech to be changed, and the output unit 244 outputs the voice having the opposite phase to the voice indicating the predicted speech.

Therefore, the output apparatus 200 according to the embodiment predicts the speech of the user on the basis of the estimated emotion of the user, decides the predicted speech as the speech to be changed, and outputs the voice having the opposite phase to the voice indicating the predicted speech, and can thus remove appropriately the information satisfying the predetermined condition.

In addition, the output apparatus 200 according to the embodiment further includes the learning unit (for example, the learning unit 132 of the information processing device 100) that causes a model to learn a speech of a content satisfying a predetermined condition in a speech uttered by the user when the user has a predetermined emotion, in which the decision unit 243 decides the speech to be changed using the model.

Therefore, the output apparatus 200 according to the embodiment decides the speech to be changed using the model that has learned the speech of the content satisfying the predetermined condition in the speech uttered by the user when the user has the predetermined emotion, and can thus remove appropriately the information satisfying the predetermined condition.

In addition, in the output apparatus 200 according to the embodiment, the estimation unit 242 estimates the emotion of the user from the biological information of the user among the detection information detected by the predetermined detection device.

Therefore, the output apparatus 200 according to the embodiment estimates the emotion of the user from the biological information of the user among the detection information detected by the predetermined detection device, and can thus remove appropriately the information satisfying the predetermined condition.

Although some of the embodiments of the present application have been described in detail with reference to the drawings hereinabove, these are examples, and it is possible to carry out the present invention in other embodiments in which various modifications and improvements have been made on the basis of knowledge of those skilled in the art, including aspects described in a section of the disclosure of the present invention.

According to one aspect of the embodiment, there is an effect that information satisfying a predetermined condition can be appropriately removed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An output apparatus comprising:
a processor configured to estimate an emotion of a user from detection information detected by a detection device;
the processor is configured to predict occurrence of a target speech based on the estimated emotion of the user and a pre-speech;
the processor is configured to determine, for occurrence of the target speech being predicted, to change the target speech based on the estimated emotion of the user; and
the processor is configured to output a sound with an opposite phase to the target speech to cancel the predicted target speech when the target speech is uttered by the user.

2. The output apparatus according to claim 1, wherein
predict occurrence of a target speech based on the estimated emotion of the user comprises predicting a speech of the user based on
the estimated emotion of the user,
wherein the speech comprises the target speech and the pre-speech.

3. The output apparatus according to claim 1, wherein
estimate the emotion of the user comprises estimating the emotion of the user when the user makes an initiating speech.

4. The output apparatus according to claim 1, wherein
estimate the emotion of the user comprises estimating the emotion of the user on receipt of an initiating speech made by a speaker.

5. The output apparatus according to claim 1, wherein
determine to change the target speech based on the estimated emotion of the user comprises determining to change the target speech when
the emotion of the user satisfies a predetermined condition.

6. The output apparatus according to claim 5, wherein
the predetermined condition is satisfied when the emotion of the user is a negative emotion.

7. The output apparatus according to claim 1, further comprising
a second processor that generates a model to learn a speech of a content satisfying a predetermined condition in a speech uttered by the user when the user has a predetermined emotion, wherein
the model is deployed to the first processor to predict occurrence of the target speech.

8. The output apparatus according to of claim 1, wherein
the detection information comprises biological information of the user.

9. An output method executed by a computer, comprising:
an estimation step of estimating an emotion of a user from detection information detected by a detection device;

a prediction step of predicting occurrence of a target speech based on the estimated emotion of the user and a pre-speech;

a determination step of determining, for occurrence of the target speech being predicted, to change the target speech based on the estimated emotion of the user; and an output step of outputting a sound with an opposite phase to the target speech to cancel the predicted target speech when the target speech is uttered by the user.

10. A non-transitory computer-readable recording medium having stored therein an output program for causing a computer to execute:

an estimation procedure of estimating an emotion of a user from detection information detected by a detection device;

a prediction procedure of predicting occurrence of a target speech based on the estimated emotion of the user and a pre-speech;

a determination procedure of determining, for occurrence of the target speech being predicted, to change the target speech based on the estimated emotion of the user; and an output procedure of outputting a sound with an opposite phase to the target speech to cancel the predicted target speech when the target speech is uttered by the user.

* * * * *